United States Patent Office 3,267,126
Patented August 16, 1966

3,267,126
COMPLEX SPIROCYCLIC ESTERS OF BORIC ACID
Theodor Weil, New Brunswick, N.J., assignor to FMC Corporation, New York, N.Y., a corporation of Delaware
No Drawing. Filed Nov. 8, 1962, Ser. No. 236,392
10 Claims. (Cl. 260—462)

This invention relates to novel esters of boric acid and, in particular, it relates to novels spirocyclic complexes of boric acid.

Simple boric acid esters have not been previously useful in many applications because of their susceptibility to moisture. They decompose so easily by hydrolysis to boric acid and the alcohol that they cannot be used where moisture is present to cause hydrolysis.

I have discovered a novel class of hydrolytically stable, spirocyclic boric acid complex esters containing tetra-coordinated boron. These novel non-polymeric esters have the formula

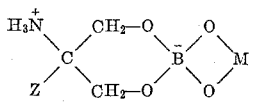

wherein Z is lower alkyl and M is selected from the group consisting of a substituted ethylene group, trimethylene group or aromatic ring in which the oxygen atoms are connected to adjacent carbon atoms.

Preferably, M has the following substituents: when M is an ethylene group of the formula

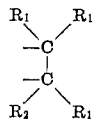

$R_1$ may each be hydrogen, alkyl, aryl, and $R_2$ may be hydrogen, alkyl, aryl, alkoxyalkyl, alkenyloxyalkyl, aryloxyalkyl, alkylcarbonyloxyalkyl, or mercaptoalkyl. When M is a trimethylene group of the formula

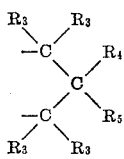

$R_3$ and $R_4$ may each be hydrogen or alkyl, and $R_5$ may be hydrogen, alkyl, alkenyloxyalkyl, alkoxyalkyl, or $R_4$ and $R_5$ may be joined in a heterocyclic group; and when M is an aromatic group of the formula

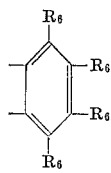

$R_6$ may each be hydrogen or lower alkyl. These borate complexes are useful as fungicides and bactericides, and they have surprising stability, even in the presence of water.

My new boric acid compounds are prepared by the reaction between boric acid or boric anhydride, a 1,2- or 1,3-diol, and a 2-amino-2-alkyl-1,3-propanediol. The condensation reaction causes the splitting off of three moles of water per mole of product. The reaction can either be performed by combining all three reactants in an inert liquid medium and heating to the reaction temperature or in a stepwise fashion by first reacting the boron compound with one of the diols, thereby separating off two moles of water for each mole of the intermediate condensate, then adding the second diol and removing the third mole of water.

The reactants can be combined in any manner described above in an inert organic solvent, and it is even sometimes desirable first to dissolve the reactants in water. The reaction will go to completion readily when all the water present in the system either formed in the condensation reaction or added for the purpose of dilution is removed. The reaction may be conducted at an elevated temperature or under any conditions which will enable the water to be distilled off, and it is continued until three moles of water is formed for each mole of product. Preferably, water is continually removed throughout the entire reaction. The reaction will proceed at room temperature in inert solvent, in which case no water need be removed. However, the reaction time will be longer than at elevated temperatures. Upon completion of the reaction, the final non-polymeric product is a crystal.

Surprisingly, the amine-boric acid intermediate condensate will not react with a monohydric alcohol. In order to obtain my stable complex esters, the alcohol reactant must be dihydric. The reaction sequence is as follows:

REACTION 1

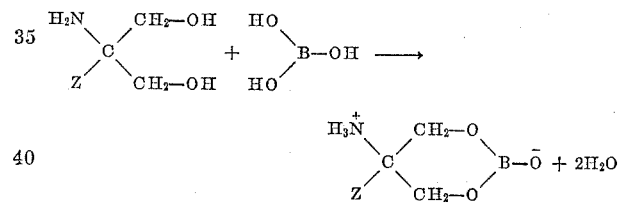

REACTION 2

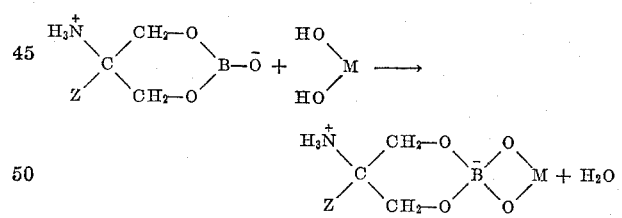

wherein Z and M have the scope previously assigned. The reaction sequence may be changed by adding the diol prior to the aminodiol, or together with it.

Removal of the water can be performed in a number of different known ways. A common method of water removal is by azeotropic distillation during the reaction using a water-immiscible liquid carrier for the reaction. Suitable azeotrope-forming solvents include chloroform, hexane, heptane, benzene, methylene chloride, or other inert, organic liquids. The azeotrope mixture can be readily separated, for example, in a Dean-Stark apparatus, and the solvent can be returned to the reaction vessel. The reaction temperature should be below about 100° C.

As stated above, either boric acid or boric anhydride may be employed at one of the reactants. Only half a mole of the anhydride is needed as shown below:

REACTION 1a

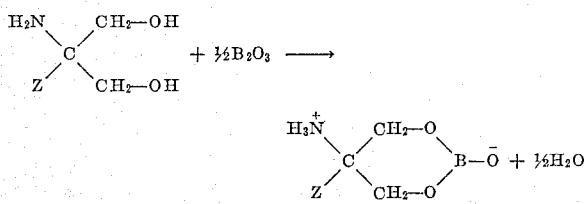

Reaction 2 will be the same as Reaction 2 above.

My amine reactants are the 2-amino-2-alkyl-1,3-propanediols. Preferably, the alkyl radicals are methyl and ethyl.

It is just as suitable to react the boron compound with the second diol prior to adding the amino compound. In that case, the intermediate will be

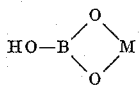

This intermediate is then reacted with the aminodiol to produce the ester.

I have found that highly substituted diols will react, if at all, only with difficulty; that is, under more rigorous conditions. Acceptable diols include ethylene glycol, 1,2- and 1,3-propanediol, 1,3- and 2,3-butanediol, 2,2-dimethyl-1,3-propanediol (neopentyl glycol), 2,2-diethyl-1,3-propanediol, 2-butyl-2-ethyl-1,3-propanediol, 2-ethyl-2-allyl-oxymethyl-1,3-propanediol, pinacol, 2-phenyl-oxazoline-4,4-dimethanol, pyrocatechol, and monoacetin. Diols containing other substituents than those above listed may be used, providing the substituents do not interfere with the condensation reaction.

The following examples are illustrative of my invention.

*Example 1*

A mixture of 29.7 grams (0.250 mole) of 2-amino-2-ethyl-1,3-propanediol and 15.46 grams (0.250 mole) of boric acid in 500 ml. of chloroform were heated to reflux on a steam bath. The water-chloroform azeotrope which distilled off was separated in a Dean-Stark trap. When about 8 ml. of $H_2O$ had been collected, a precipitate formed. The yield of boron-aminodiol intermediate was quantitative.

*Anal.*—Calc. for $C_5H_{12}O_3NB$: C, 41.42; H, 8.34. Found: C, 40.23; H, 9.07.

*Example 2*

A mixture of 52 grams (0.5 mole) of neopentyl glycol, 26.3 grams (0.5 mole) of 2-amino-2-methyl-1,3-propanediol and 30.9 grams (0.5 mole) of boric acid were dissolved in 80 ml. of water in a 3-necked flask equipped with a Dean-Stark distillation trap. The mixture was heated slowly until a completely clear solution was obtained. Then 300 ml. of heptane were added and the mixture heated on a steam bath. Approximately 25 ml. of water was collected in the trap. A precipitate formed at the end of the reaction. This solid matter was filtered off, washed with ether, and dried. The yield of this crystalline precipitate was 100 grams (92.6% of theoretical).

*Anal.*—Calc. for $C_9H_{20}O_4NB$: C, 49.80; H, 9.24. Found: C, 49.41; N, 9.51.

An almost identical product was obtained by stirring the above reactants in ether for 24 hours at room temperature.

*Example 3*

A mixture of 26.28 grams (0.25 mole) of 2-amino-2-methyl-1,3-propanediol, 22.5 grams (0.25 mole) of 1,3-butanediol, and 15.46 (0.25 mole) of boric acid was heated on a steam bath in 500 ml. of heptane. The water-heptane distillate yielded a total of 12 ml. of water. During the azeotropic distillation, 40 grams of precipitate formed and was filtered and dried. The yield was 80% of theoretical.

*Anal.*—Calc. for $C_8H_{18}O_4NB$: C, 47.32; H, 8.94. Found: C, 47.06; H, 9.19.

*Example 4*

The tables below list compounds prepared by reacting boric acid or anhydride, 2-amino-2-methyl- and 2-amino-2-ethyl-1,3-propanediol and various diols together using the methods employed in the above examples. These tables are arranged by listing the diols used. The formula and elemental analyses of each borate ester are included.

A. ESTERS PREPARED WITH 2-AMINO-2-METHYL-1,3-PROPANEDIOL

| Diol | Formula | Analysis | | | | | | | |
|---|---|---|---|---|---|---|---|---|---|
| | | C | | H | | N | | B | |
| | | Calc. | Found | Calc. | Found | Calc. | Found | Calc. | Found |
| Ethylene glycol | $C_6H_{14}O_4NB$ | 41.18 | 39.84 | 8.06 | 8.40 | 8.00 | 7.63 | 6.18 | 5.98 |
| 1,2-propanediol | $C_7H_{16}O_4NB$ | 44.48 | 43.25 | 8.53 | 8.77 | 7.41 | 6.71 | 5.72 | 5.37 |
| 1,3-propanediol | $C_7H_{16}O_4NB$ | | | | | 7.41 | 7.72 | 5.72 | 5.40 |
| 2,3-butanediol | $C_8H_{18}O_4NB$ | 47.32 | 45.62 | 8.94 | 9.05 | 6.09 | 6.94 | 5.33 | 5.51 |
| Monoacetin | $C_9H_{18}O_6NB$ | 43.74 | 43.91 | 7.35 | 7.80 | | | | |
| Pyrocatechol | $C_{10}H_{14}O_4NB$ | 53.86 | 52.51 | 6.33 | 6.81 | 6.28 | 5.99 | 4.85 | 4.71 |
| 2-methyl-2,4-pentanediol | $C_{10}H_{22}O_4NB$ | 51.97 | 53.31 | 9.60 | 9.99 | 6.06 | 6.35 | 4.68 | 4.46 |
| Pinacol | $C_{10}H_{22}O_4NB$ | 51.97 | 51.66 | 9.60 | 9.38 | 6.06 | 6.15 | 4.68 | 4.72 |
| 2,2-dimethyl-1,3-butanediol | $C_{10}H_{22}O_4NB$ | 51.97 | 52.07 | 9.60 | 9.89 | 6.06 | 6.09 | 4.68 | 4.48 |
| 2,2-diethyl-1,3-propanediol | $C_{11}H_{24}O_4NB$ | 53.91 | 53.97 | 9.81 | 10.10 | 5.72 | 6.33 | 4.42 | 5.34 |
| 2-ethyl-2-allyloxy-methyl-1,3-propanediol | $C_{13}H_{26}O_5NB$ | 54.37 | 53.85 | 9.13 | 9.28 | | | | |
| 3-(0-tolyloxy)-1,2-propanediol | $C_{14}H_{22}O_5NB$ | 56.97 | 57.67 | 7.52 | 8.09 | | | | |
| 2-phenyl-oxazoline-4,4-dimethanol | $C_{15}H_{24}O_5N_2B$ | | | | | 8.75 | 8.24 | 3.38 | 3.20 |
| Benzopinacol | $C_{30}H_{30}O_4NB$ | 75.16 | 73.25 | 6.31 | 6.52 | 2.92 | 2.65 | 2.25 | 2.94 |

B. ESTERS PREPARED WITH 2-AMINO-2-ETHYL-1,3-PROPANEDIOL

| Diol | Formula | C | | H | | N | | B | |
|---|---|---|---|---|---|---|---|---|---|
| | | Calc. | Found | Calc. | Found | Calc. | Found | Calc. | Found |
| Ethylene glycol | $C_7H_{16}O_4NB$ | 44.48 | 43.82 | 8.53 | 8.74 | | | | |
| Neopentyl glycol | $C_{10}H_{22}O_4NB$ | 51.97 | 50.90 | 9.60 | 9.54 | 6.06 | 6.53 | 4.68 | 4.58 |

Example 5

To show the utility of these compounds, several esters were prepared according to the procedure of Example 1 with different diols as listed below. The compounds were then tested for fungicidal effect on *Aspergillus niger*, *Pullularia pullulans*, *Penicillium expansum* and *Alternaria solani*. They were also tested for effectiveness in killing *Bacillus mycoides* and *Aerobacter aerogenes*.

FUNGICIDAL AND BACTERICIDAL TESTS OF BORIC ACID ESTERS WITH DIFFERENT DIOLS AND 2-AMINO-2-METHYL-1,3-PROPANEDIOL

| Diols | Fungicidal Tests | | | | Bactericidal Tests | |
|---|---|---|---|---|---|---|
| | A. niger | P. pullulans | Pen. expansum | Alt. solani | B. mycoides | A. Aerogenes |
| Neopentyl glycol, mm | 3 | 3 | 4 | (1) | 3 | 3 |
| Ethylene glycol, mm | 10 | 13 | 15 | 16 | 7 | 10 |
| 1,2-propanediol, mm | 5 | 13 | 5 | 10 | 7 | 9 |
| Pyrocatechol, mm | 12 | 17 | 13 | (2) | 12 | 11 |
| 2,3-butanediol, mm | 4 | 6 | 10 | 8 | 4 | 8 |
| 2,2-dimethyl-1,3-butanediol, mm | 2 | 4 | 10 | 5 | (1) | (1) |
| 2-methyl-2,4-pentanediol, mm | 6 | 7 | 13 | 5 | 6 | 6 |
| 1,3-propanediol, mm | 9 | 13 | 19 | 12 | 8 | 13 |
| Pinacol, mm | 3 | 2 | 11 | 5 | (1) | 3 |

¹ No inhibition.
² Complete inhibition.

The above results were obtained by placing 0.25 gram of the test compound inside a ring of 10–12 ml. inside diameter drawn in the center of a plate containing fungus or bacterial cultures. The fungus culture was incubated at 20° C. for 72 hours; the bacteria culture was incubated at 37° C. from 24–36 hours. After incubation, if a clear zone resulted showing that the organism did not grow, the test compound was reported as toxic to the organism. The distance of the clear zone from the nearest culture growth to the center of the ring was measured and reported; for example, a non-toxic specimen or blank standard would have a measurement of zero or no inhibition.

The amino-boric acid intermediate also has fungicidal and bactericidal activity. Using the same test method as above, the following results were obtained with the 2-amino-2-methylpropanediol-boric acid intermediate compound:

A. niger _____ mm __ 8
P. pullulans _____ mm __ 10
Pen. expansum _____ mm __ 14
Alt. solani _____ No inhibition
B. mycoides _____ mm __ 8
A. aerogenes _____ mm __ 8

The boric acid esters prepared herein are not only stable to hydrolysis, but are also water-soluble, and they may conveniently be applied as a pesticide in a water solution as well as in an inert organic solvent.

Having fully described my invention, I claim:

1. A spirocyclic borate ester of the formula

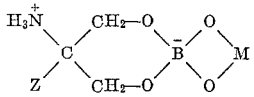

in which Z is hydrogen or lower alkyl and M is
(a) an ethylene group of the formula

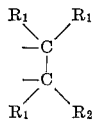

in which each $R_1$ is hydrogen, lower-alkyl or phenyl, and $R_2$ is hydrogen, lower-alkyl, phenyl, lower-alkoxy-lower-alkyl, allyloxy-lower-alkyl, phenoxy-lower-alkyl, lower-alkylphenoxy-lower-alkyl, lower-alkyl-carbonyloxy-lower-alkyl or mercapto-lower-alkyl,
(b) a trimethylene group of the formula

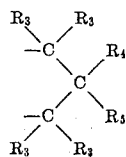

in which $R_3$ and $R_4$ are hydrogen or lower-alkyl, $R_5$ is hydrogen, lower-alkyl, allyloxy-lower-alkyl or lower-alkoxy-lower-alkyl, and $R_4$ and $R_5$ may be joined to form a 2-phenyl-oxazoline-4,4-radical, or
(c) an arylene group of the formula

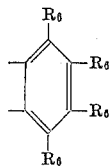

in which $R_6$ is hydrogen, lower-alkyl or mercapto.

2. A spirocyclic borate ester of claim 1 in which M is an ethylene group of Formula a.

3. A spirocyclic borate ester of claim 1 in which M is a trimethylene group of Formula b.

4. A spirocyclic borate ester of claim 1 in which M is an arylene group of Formula c.

5. A spirocyclic borate ester of the formula

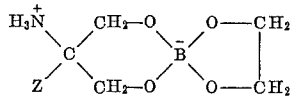

wherein Z is methyl or ethyl.

6. A spirocyclic borate ester of the formula

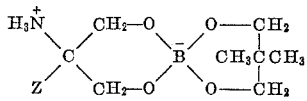

wherein Z is methyl or ethyl.

7. A spirocyclic borate ester of the formula

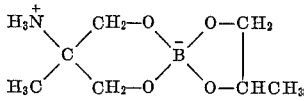

8. A spirocyclic borate ester of the formula

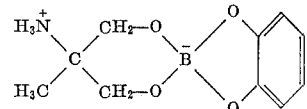

9. A spirocyclic borate ester of the formula
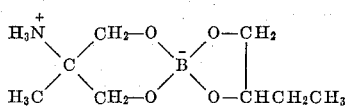
10. A cyclic borate ester having the formula
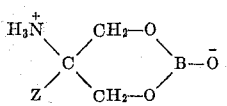
wherein Z is a lower alkyl radical.
References Cited by the Examiner
UNITED STATES PATENTS
| | | | |
|---|---|---|---|
| 2,987,519 | 6/1961 | Zenitz | 260—307 |
| 2,902,450 | 9/1959 | Lowe | 260—462 |
| 3,009,791 | 11/1961 | Emrick | 260—462 |
| 3,030,374 | 4/1962 | Belden | 260—307 |
| 3,033,892 | 5/1962 | McCloskey | 260—462 |
| 3,053,880 | 9/1962 | Dale | 260—462 |
CHARLES B. PARKER, *Primary Examiner.*
NICHOLAS RIZZO, *Examiner.*
ALTON D. ROLLINS, DELBERT R. PHILLIPS,
*Assistant Examiners.*

UNITED STATES PATENT OFFICE
CERTIFICATE OF CORRECTION

Patent No. 3,267,126                 August 16, 1966

Theodor Weil

It is hereby certified that error appears in the above numbered patent requiring correction and that the said Letters Patent should read as corrected below.

Column 1, line 10, for "novels" read -- novel --; column 3, line 2, for "at" read -- as --; line 41, for "29.7" read -- 29.74 --; columns 3 and 4, table A, under the heading "N", line 4 thereof, for "6.09" read -- 6.90 --.

Signed and sealed this 1st day of August 1967.

(SEAL)
Attest:

EDWARD M. FLETCHER, JR.                 EDWARD J. BRENNER
Attesting Officer                                   Commissioner of Patents